(12) United States Patent
Liu et al.

(10) Patent No.: US 8,418,636 B2
(45) Date of Patent: Apr. 16, 2013

(54) IN-GROUND SEED SPACING MONITORING SYSTEM FOR USE IN AN AGRICULTURAL SEEDER

(75) Inventors: James Z. Liu, Belvidere, IL (US); Nikolai R. Tevs, Fargo, ND (US); Elijah B. Garner, Bettendorf, IA (US)

(73) Assignee: Deere & Company, Moline, IL (US)

( * ) Notice: Subject to any disclaimer, the term of this patent is extended or adjusted under 35 U.S.C. 154(b) by 307 days.

(21) Appl. No.: 12/860,373

(22) Filed: Aug. 20, 2010

(65) Prior Publication Data

US 2012/0042813 A1 Feb. 23, 2012

(51) Int. Cl.
*A01B 79/00* (2006.01)
*A01C 7/10* (2006.01)

(52) U.S. Cl.
USPC ............. 111/200; 111/900; 701/50; 700/231

(58) Field of Classification Search .................. 111/200, 111/900; 701/50, 213; 700/225, 231; 702/5, 702/187; 342/357.17; 250/222.2
See application file for complete search history.

(56) References Cited

U.S. PATENT DOCUMENTS

| 6,386,128 | B1 | 5/2002 | Svoboda et al. |
| 7,726,251 | B1 | 6/2010 | Peterson et al. |
| 2003/0009282 | A1 | 1/2003 | Upadhyaya et al. |
| 2009/0112475 | A1 | 4/2009 | Christy et al. |
| 2010/0116974 | A1 | 5/2010 | Liu et al. |
| 2011/0046776 | A1 | 2/2011 | Goldman et al. |

FOREIGN PATENT DOCUMENTS

| DE | 19725546 | 3/1999 |
| DE | 10148748 | 4/2003 |
| EP | 2047735 | 4/2009 |
| WO | 2011053286 | 5/2011 |

OTHER PUBLICATIONS

European Search Report received Dec. 2, 2011 (5 pages).

*Primary Examiner* — Christopher J. Novosad
(74) *Attorney, Agent, or Firm* — Taylor IP, P.C.

(57) ABSTRACT

A row crop unit for use in an agricultural seeder includes a furrow opener for opening a furrow in the soil, a seed metering system for metering seed to be placed in the furrow, and a seed placement system for placing seeds in the furrow. The seed placement system and the seed metering system are in communication with each other and at least in part define a seed travel path associated with the furrow. A furrow closer covers the seed in the furrow with soil. A seed temperature conditioner is associated with the seed travel path for varying a temperature of seed traveling through the seed travel path. A temperature sensitive sensor is positioned to sense seed which has been deposited in the furrow between the furrow opener and the furrow closer. An optional packaging tube holds a temperature sensor or sensor array. A lens is mounted with the same tube. A larger diameter tube may be positioned around the sensor packaging tube. A positive air pressure/air flow may be introduced between the two tubes. This positive airflow forms a positive pressure and/or air flow barrier to push dust away from the sensor lens or sensor surface.

25 Claims, 7 Drawing Sheets

IN-GROUND SEED SPACING MONITORING SYSTEM FOR USE IN AN AGRICULTURAL SEEDER

FIELD OF THE INVENTION

The present invention relates to agricultural seeders, and, more particularly, to seed spacing monitoring systems for use in such seeders.

BACKGROUND OF THE INVENTION

An agricultural seeder, such as a row crop planter, air seeder or grain drill, places the seed at a desired depth within a plurality of parallel seed trenches (or furrows) formed in soil. In the case of a row crop planter, a plurality of row crop units are typically ground driven using wheels, shafts, sprockets, transfer cases, chains and the like. Each row crop unit has a frame, which is movably coupled with a tool bar. The frame may carry a main seed hopper, herbicide hopper and insecticide hopper. If the granular herbicide and insecticide are used, the metering mechanisms associated therewith for the dispensing of the granular product into the seed trench are relatively simple. On the other hand, mechanisms necessary to properly meter seeds at a predetermined rate and to place the seeds at predetermined relative locations and depth within the seed trench are relatively complicated.

The mechanisms associated with metering and placing of the seeds generally can be divided into a seed metering system and a seed placement system, which are in communication with each other. The seed metering system receives the seeds in a bulk manner from a seed hopper carried by the frame. Different types of seed metering systems can be used such as seed plates, finger plates and seed disks. In the case of a seed disk metering system, a seed disk is formed with a plurality of seed cells spaced about the periphery thereof. Seeds are moved into the seed cells with one or more seeds in each seed cell depending upon the size and configuration of the seed cell. A vacuum or positive pressure airflow may be used in conjunction with the seed disk to assist in movement and retention of the seeds in the seed cells. The seeds are singulated and discharged at a predetermined rate to the seed placement system.

The seed placement system may be categorized as a gravity drop system or a power drop system. In the case of a gravity drop system, a seed tube has an inlet end, which is positioned below the seed metering system. The singulated seeds from the seed metering system merely drop into the seed tube and fall by way of gravitational force from a discharge end thereof into the seed trench. The seed tube may be curved in a rearward manner to assist in directing the seed into the seed trench.

A seed placement system of the power drop variety generally can be classified as a seed conveyor belt drop, rotary valve drop, chain drop or air drop. These types of seed placement systems provide somewhat consistent placement of the seeds along a predetermined path at a desired spacing.

It is well known in the agricultural industry to use an electronic planting monitor on seeders to monitor the seed which is placed in the furrow. When first employed, monitors were used to alert the operator of a plugged row unit or a unit without any seed to avoid continued operation of the planter without actually planting seed. More recently, studies have quantified the importance of accurate seed spacing in improving crop yields. As a result, monitor technology has advanced in efforts to determine seed spacing. Current monitors determine skips and multiples of seed. These monitors also predict seed spacing in the furrow based on the timing of seed passing a sensor (such as a photo-electric eye) in a seed tube but are not capable of determining actual seed spacing.

One example of a seed spacing monitor is disclosed in U.S. Pat. No. 6,386,128 B1 (Svoboda et al.). The '128 patent senses the seed and determines a geospatial location of the seed. From this information, seed spacing can be determined. However, the sensor is described as detecting the falling seed and transmitting a corresponding signal to the computer which then records the seed drop event. In this system, since the sensor detects "falling" seed, any bounce or roll of the seed in the furrow is not accounted for in determining the seed location.

U.S. Pat. No. 7,726,251 B1 (Peterson et al.), which is assigned to the assignee of the present invention, discloses that it is possible to sense seeds directly in a seed trench. Referring to FIGS. 7 and 8, a sensor may be used to sense seeds in the seed trench, and the pulses representing each sensed seed are used to uniformly stagger seeds relative to each other in a twin row seeding application.

What is needed in the art is a way of more accurately detecting seed spacing of seeds which are placed in a furrow in the soil.

SUMMARY OF THE INVENTION

The seed spacing monitoring system of the present invention uses a seed temperature conditioner such as a heater to vary a temperature of the seed prior to placement in the furrow, and a temperature sensitive sensor such as an infrared (IR) sensor array to sense the seed in its final location in the seed furrow immediately before the furrow is closed, covering the seed with soil.

The invention in one form is directed to a row crop unit for use in an agricultural seeder for planting seeds in soil. The row crop unit includes a furrow opener for opening a furrow in the soil, a seed metering system for metering seed to be placed in the furrow, and a seed placement system for placing seeds in the furrow. The seed placement system and the seed metering system are in communication with each other and at least in part define a seed travel path associated with the furrow. A furrow closer covers the seed in the furrow with soil. A seed temperature conditioner is associated with the seed travel path for varying a temperature of seed traveling through the seed travel path. A temperature sensitive sensor is positioned to sense seed which has been deposited in the furrow between the furrow opener and the furrow closer.

The invention in another form is directed to a seed spacing detection method for detecting seed spacing of seeds placed in a furrow by a seeder. The method includes the steps of: opening a furrow in the soil; metering seed to be deposited in the furrow; varying a temperature of the seed prior to being deposited in the furrow; placing the metered seed in the furrow; and detecting seed in the furrow before the seed is covered with soil using a temperature sensitive sensor.

The invention in yet another form is directed to a row crop unit for use in an agricultural seeder for planting seeds in soil. The row crop unit includes a furrow opener for opening a furrow in the soil, a seed metering system for metering seed to be placed in the furrow, and a seed placement system for placing seeds in the furrow. The seed placement system and the seed metering system are in communication with each other and at least in part define a seed travel path associated with the furrow. A furrow closer covers the seed in the furrow with soil. A seed temperature conditioner is associated with the seed travel path for varying a temperature of seed traveling through the seed travel path. A temperature sensitive sensor or sensor array is positioned to sense seed which has been deposited in the furrow between the furrow opener and the furrow closer. The invention may further include a packaging tube for use with the IR sensor. The packaging tube for the IR sensor or sensor array may include a lens for reduced viewing angle and hence increased sensitivity. The sensor packaging tube may further be placed inside of another larger diameter tube, and positive air flow may be introduced between the 2 tubes. This positive air-flow forms an air flow barrier to push dust away from the sensor lens or sensor surface.

DETAILED DESCRIPTION OF THE INVENTION

Figure 1:
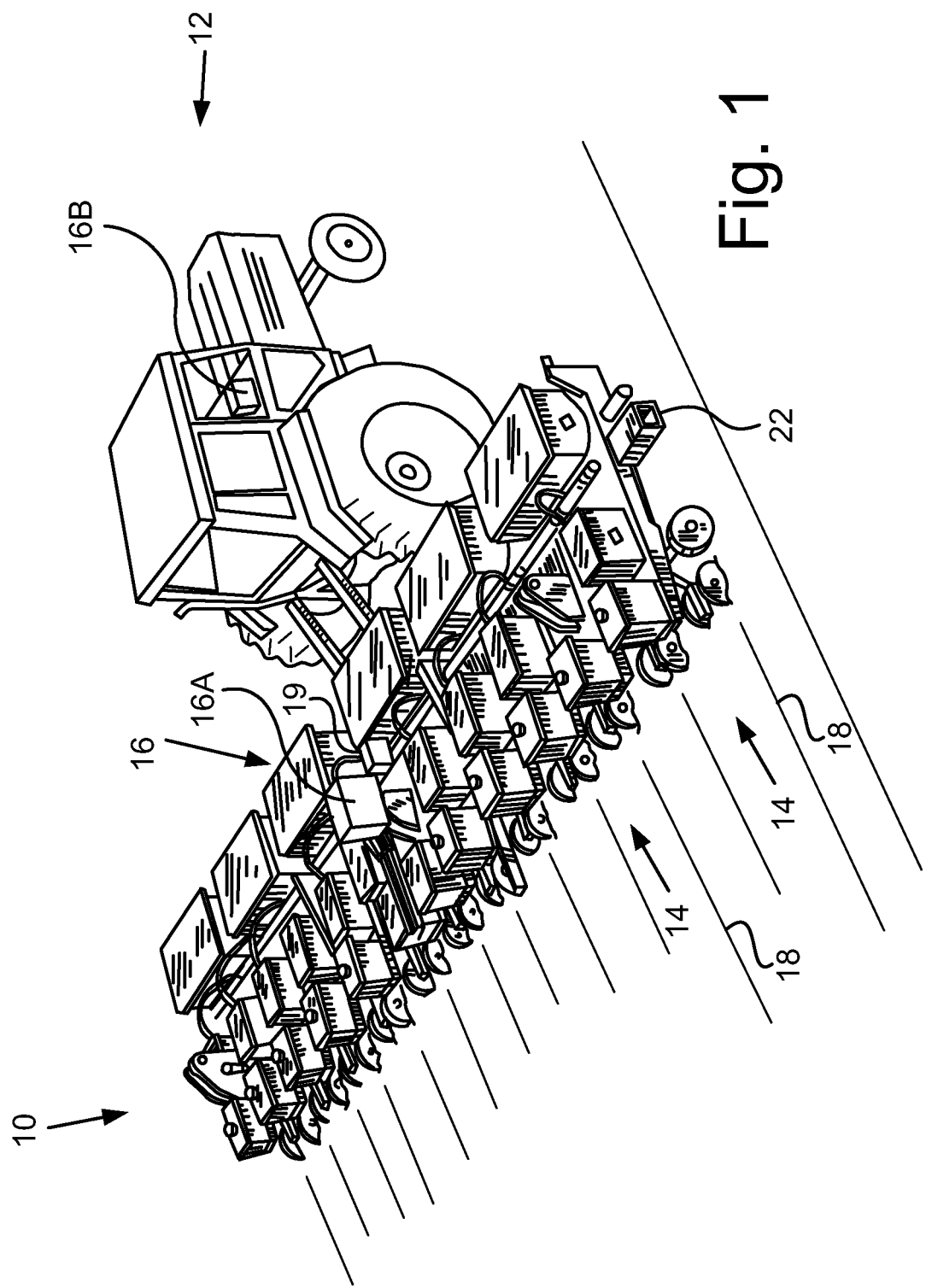
FIG. 1 is a perspective view of an agricultural seeder incorporating an embodiment of a seed spacing monitoring system of the present invention.

Referring now to the drawings, and more particularly to FIG. 1, there is shown an embodiment of an agricultural seeder 10 of the present invention. In the embodiment shown, seeder 10 is in the form of a row crop planter but may also be in the form of a grain drill, etc. A prime mover in the form of a tractor 12 is coupled with and provides motive power to seeder 10 through a suitable coupling arrangement, such as a draw bar or 3-point hitch arrangement.

Seeder 10 includes a number of row crop units 14, with each row crop unit 14 being substantially identically configured. A seed spacing monitoring system 16, which may be located onboard each of seeder 10 and tractor 12 (as shown), is used to monitor the placement of seeds within respective furrows 18 formed by each row crop unit 14. Seed spacing monitoring system 16 may include an electrical processor 16A onboard seeder 10, an electrical processor 16B onboard tractor 12, a ground speed sensor 19 and a number of temperature sensitive sensors (not visible in FIG. 1) for detecting seeds in respective furrows 18.

Ground speed sensor 19 may be located on tractor 12 or seeder 10 and provides an output signal to electrical processor 16A and/or 16B representative of the speed of seeder 12 across the ground. For example, the ground speed signal may be determined based on the engine speed and selected gear of tractor 12, a ground speed sensor 19 on seeder 12, a ground driven speed sensor associated with a ground contacting wheel of seeder 12, a Global Positioning System (GPS), a sonar system directed at the ground, a radar system directed at the ground, etc.

Figure 2:
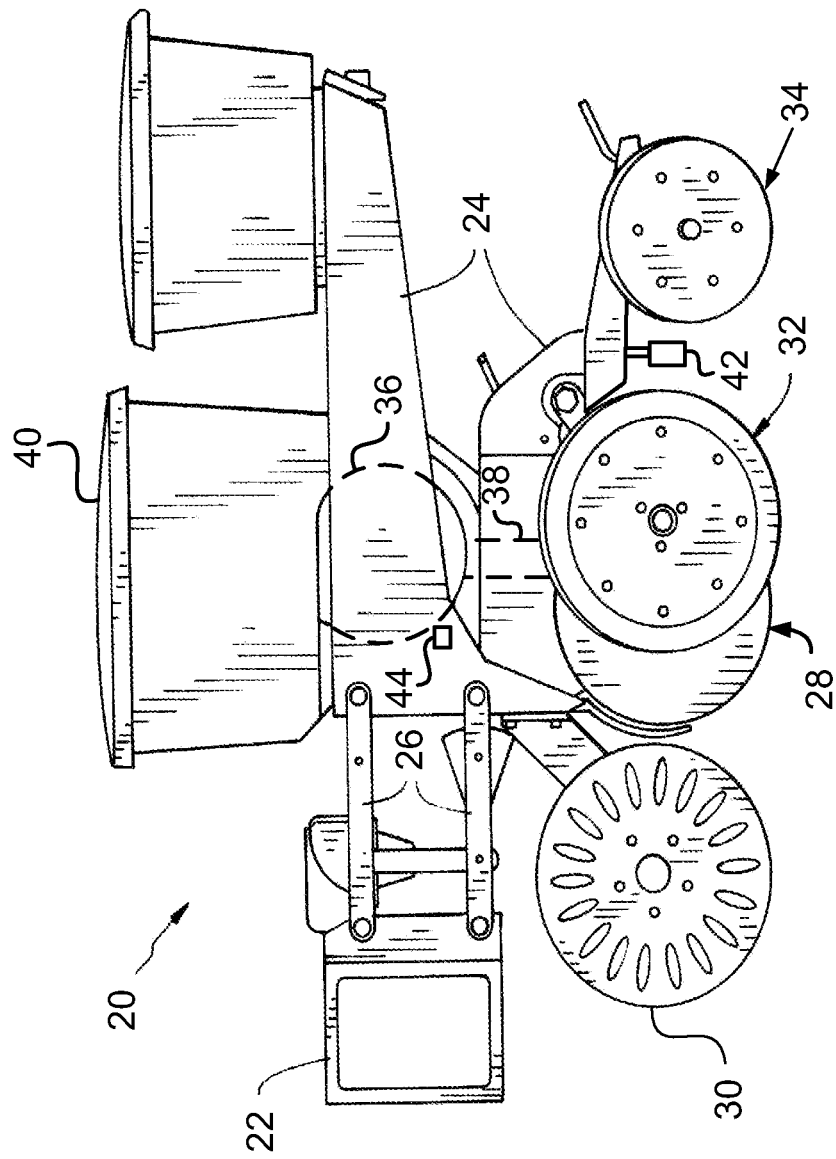
FIG. 2 is a side view of a portion of an agricultural seeder including a row crop unit with a seed spacing monitoring system of the present invention.

Referring now to FIG. 2, there is shown a single row crop unit 20 of a multi-row planter, with each row crop unit 20 being substantially identical and connected to a common tool bar 22. Only a single row crop unit 20 is shown and described below for simplicity sake.

Row crop unit 20 includes a multi-part frame 24 which is attached to tool bar 22 by parallel linkage 26. Tool bar 22 is coupled to a traction unit (not shown in FIG. 2), such as tractor 12. For example, tool bar 22 may be coupled to tractor 12 using a draw bar or 3-point hitch assembly. Tool bar 22 may be coupled with transport wheel assemblies, marker arms, etc. which may be of conventional design and not shown for simplicity sake.

Frame 24 carries a double disc furrow opener 28 for forming a seed trench in soil. An optional fluted coulter wheel 30, particularly for use in no till situations, may be placed ahead of double disc furrow opener 28. A pair of gauge wheels 32 are respectively associated with the pair of discs of double disc furrow opener 28. More particularly, each gauge wheel 32 is positioned generally in line with and immediately adjacent to the outside of each respective disc of double disc furrow opener 28. Each gauge wheel 32 may be vertically adjusted to adjust the depth of the trench which is cut into the soil using double disc furrow opener 28.

A furrow closer in the form of a pair of closing wheels 34 is also carried by frame 24. Closing wheels 34 are positioned generally in line with double disc furrow opener 28. Closing wheels 34 are preferably biased in a downward direction and have a peripheral edge with a shape which may vary, depending upon the application.

A seed metering system 36 and a seed placement system 38 are also carried by frame 24 (each shown partially in phantom lines). Seed metering system 36 receives seed from a main seed supply, such as seed from a distant main seed hopper which is supplied via air or the like, or a seed hopper 40 carried above frame 24. Seed metering system 36 singulates the seed and transfers the seed to seed placement system 38. Seed placement system 38 is in the form of a gravity drop seed tube, but could be configured differently, such as a power drop seed placement system with a powered wheel, etc.

According to an aspect of the present invention, a temperature sensitive sensor 42 forming part of the seed spacing monitoring system 16 is supported to sense seeds in the furrow prior to the seeds being covered by closing wheels 34. Temperature sensitive sensor 42 is preferably located between furrow opener 28 and closing wheels 34, and detects the presence of seeds within the furrow 18. Temperature sensitive sensor 42 provides a plurality of seed presence signals to electrical processor 16A (FIG. 1), with each seed presence signal being indicative of a respective seed present in the furrow.

In the embodiment illustrated in FIG. 2, temperature sensitive sensor 42 is configured as an IR sensor which detects the presence of individual seeds in the furrow by sensing a temperature difference between the individual seeds and the surrounding ground. This may be accomplished by using a seed temperature conditioner to either heat or cool the seeds prior to placement within the furrow. For example, a seed temperature conditioner in the form of a heater 44 can be used to blow hot air across the seeds at a suitable location within seed metering system 36. Heating of the seed between 1 to 20° F., preferably between 1 to 5° F., and even as little as 1.8° F., more than the ground temperature will enable IR sensing. Also, cooling by that difference will enable IR sensing. With such an IR sensor, a narrow sensing window can be used to sense when a seed passes the sensor within the furrow, and the sensing event can be time stamped or geo-referenced.

Other types of heaters may also be used. For example, it is possible to heat the air used to move the seed from central tanks to the mini-hoppers on the row unit. Heaters which are powered by electric, gas or diesel, etc. can be used to heat the air surrounding the seed. It may also be possible to heat seeds with the exhaust air from the vacuum fan. Heated air can also be used through a nozzle to agitate the seeds in the mini-hopper and also heat the seeds. It may also be possible to divert some of the engine exhaust to heat the seeds directly or use an air-to-air heat exchanger.

Figure 3:
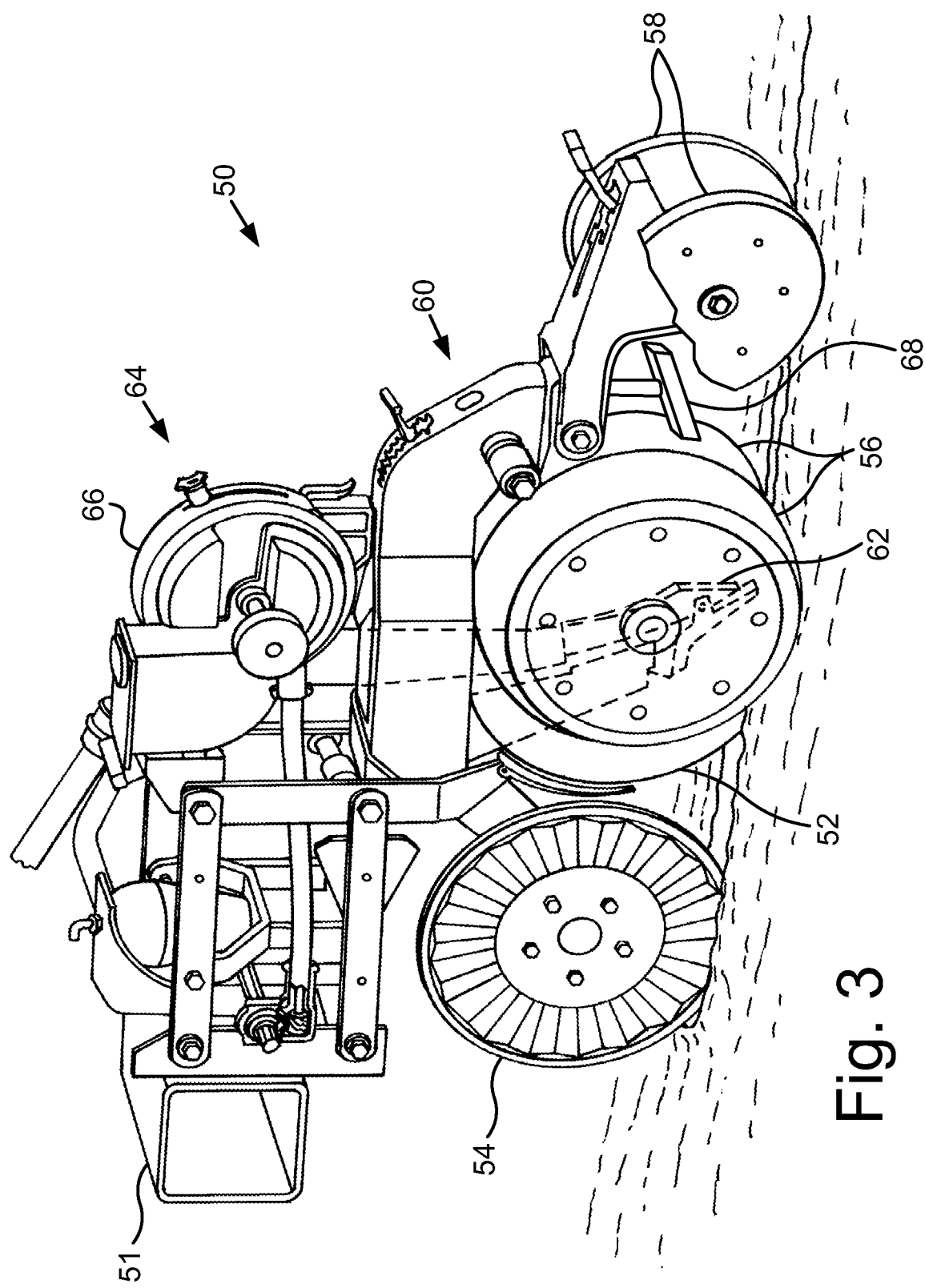
FIG. 3 is a perspective view of a portion of another agricultural seeder including a row crop unit with a seed spacing monitoring system of the present invention.

Referring now to FIG. 3, there is shown another embodiment of a single row crop unit 50 of a multi-row planter, with each row crop unit 50 being substantially identical and connected to a common tool bar 51. Only a single row crop unit 50 is shown and described below for simplicity sake.

Row crop unit 50 carries a double disc furrow opener 52 for forming a seed trench 53 in the soil. An optional coulter wheel 54, particularly for use in no-till situations, may be placed ahead of double disc furrow opener 52. A pair of gauge wheels 56 are respectively associated with the pair of discs of double disc furrow opener 52. More particularly, each gauge wheel 56 is positioned generally in line with and immediately adjacent to the outside of each respective disc of double disc furrow opener 52. Each gauge wheel 56 may be vertically adjusted to adjust the depth of the trench which is cut into the soil using double disc furrow opener 52. A furrow closer in the form of a pair of closing wheels 58 is positioned generally in line with double disc furrow opener 52. Closing wheels 58 are preferably biased in a downward direction and have a peripheral edge with a shape which may vary, depending upon the application.

A seed placement system 60 is shown in the form of a gravity drop seed tube 62, but could be configured differently, such as a power drop seed placement system with a powered wheel, etc.

A seed metering system 64 receives seed from a main seed supply, such as seed from a distant main seed hopper which is supplied via air or the like, or a seed hopper carried by tool bar 51. Within a housing 66 of seed metering system 64 there is a seed pool area. A seed disk within housing 66 (not visible) has a plurality of holes with seed cells on the seed side of the disk intermittently spaced about the periphery thereof. The vacuum airflow promotes entry of the seeds into the seed cells and maintains the seeds in place within the seed cells. Seeds are transported from the seed cells to seed tube 62. Of course, seed meter 26 may be configured with a positive pressure to assist in seed movement rather than a vacuum pressure.

Figure 4:
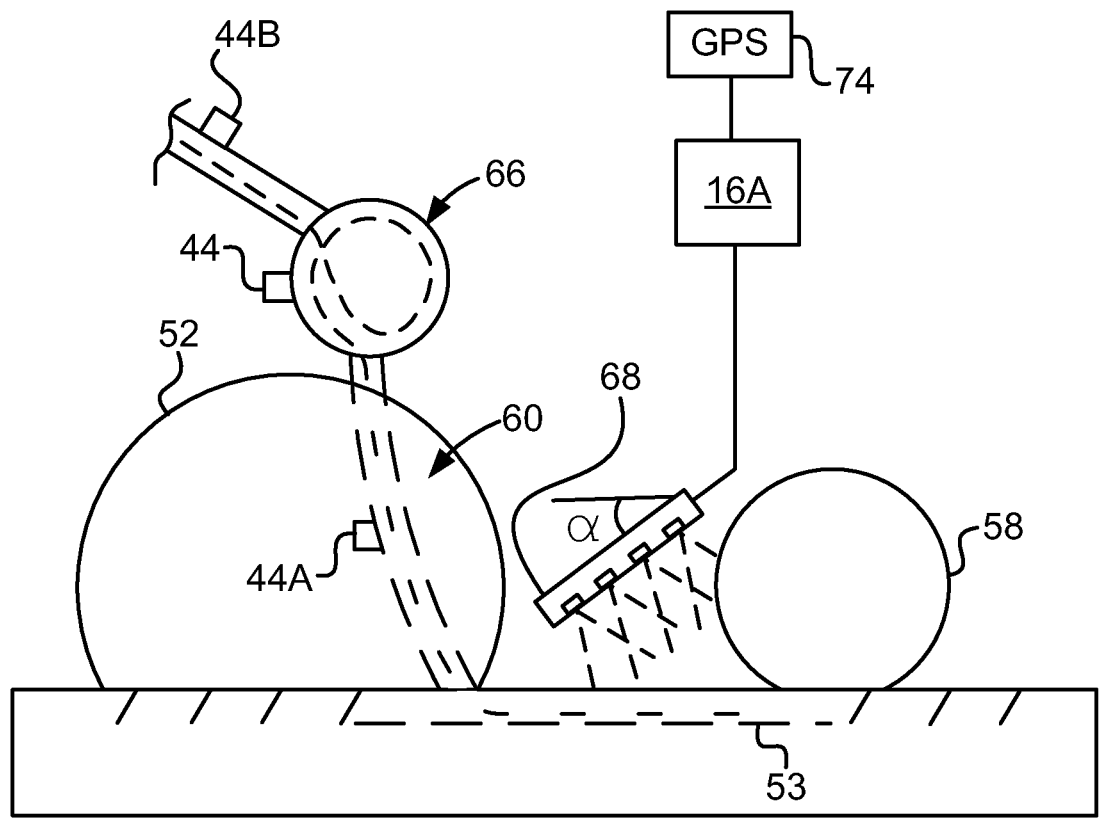
FIG. 4 is a schematic side view of yet another embodiment of a seed spacing monitoring system of the present invention.

Similar to row crop unit 20 described above, row crop unit 50 has a heater 44 which heats the seed and a temperature sensitive sensor 68 which is located in an area between furrow opener 52 and closing wheels 58 (FIGS. 3 and 4). Heater 44 is located in association with the seed travel path, and specifically is shown located in association with seed metering system 64. Alternatively, heater 44 may be located in association with the seed placement system 60 (as shown at 44A) or along the seed travel path ahead of the seed metering system (as shown at 44B). Temperature sensitive sensor 68 may be configured as described above with reference to temperature sensitive sensor 42, such as a linear IR sensor array. Temperature sensitive sensor 68 is coupled with electrical processor 16A, either wired or wirelessly, and provides a plurality of seed presence signals to electrical processor 16A. Electrical processor 16A receives the plurality of seed presence signals from temperature sensitive sensor 68 and a speed signal from speed sensor 19, and determines a seed spacing which is dependent upon each of the seed presence signals and speed signal.

Figure 5:
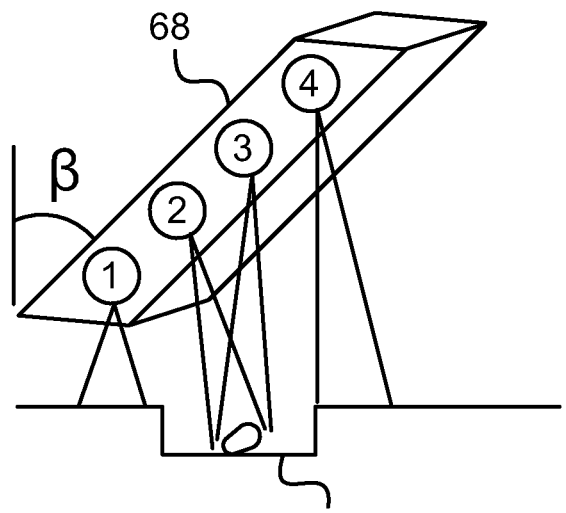
FIG. 5 is a schematic, rear view of the IR sensor shown in FIG. 4.

Temperature sensitive sensor 68, also shown schematically in FIG. 4, may be configured as an IR camera or an IR scanner. In the embodiment shown in FIGS. 3 and 4, temperature sensitive sensor 68 is configured as an IR scanner with a 1×4 linear array of IR sensors (i.e., four IR sensors arranged in a single row) providing at least one seed presence signal to electrical processor 16A and/or 16B. The linear array of IR sensors 68 provide discrete output signals, with each output signal corresponding to one or more seed presence signals. Alternatively, the array of IR sensors 68 can provide a combined (composite) signal to electrical processor 16A and/or 16B. IR sensor 68 is positioned at a downward and rearward facing orientation relative to a travel direction of the row crop unit, allowing a longer portion of the furrow 53 to be sensed between the furrow opener 52 and closing wheels 58. More particularly, IR sensor 68 is positioned at an angle of between approximately 15° to 60°, and preferably approximately 30°, relative to a horizontal. For other applications, it may be desirable to position IR sensor 68 with a front face which is generally horizontal. Moreover, IR sensor 68 may be positioned such that it is canted with a side-to-side orientation of between approximately 5° to 45° relative to a vertical (FIG. 5). When positioned with a canted orientation, it is possible for each sensor (e.g., of a linear 1×4 array) to provide discrete signals to electrical processors 16A and/or 16B. The center two sensors (2 and 3) may be used to detect seeds in the furrow 18, and the outer two sensors (1 and 4) may be used to detect seeds on either side the furrow 18 in the event of seed bounce, etc.

In the embodiments of the seed spacing monitoring systems described above, temperature sensitive sensors 42 and 68 provide seed presence signals to electrical processors 16A and/or 16B, which in turn time stamp the seed presence signals and determine a seed spacing based on the time relationship between seeds. However, it may be desirable to geo-reference the seed presence signals using a geo-referencing system. One type of geo-referencing system is a Global Positioning System (GPS) 74 which may be used to geo-reference the location of each sensed seed within the furrow. More specifically, the assignee of the present invention markets a GPS known as a "GreenStar" GPS which is typically mounted on top of the cab of tractor 12 (not shown), and could be used with the present invention for geo-referencing of the seed presence signals. As another option, a stand-alone GPS could be mounted to seeder 10 for geo-referencing the seed presence signals. As yet another option, a geo-referencing system configured as a localized sensor system could be used to geo-reference the seed presence signals. For example, sensors could be positioned at predefined locations around the perimeter of a field which interact with a transceiver mounted on seeder 10 for geo-referencing the seed presence signals.

Figure 6:
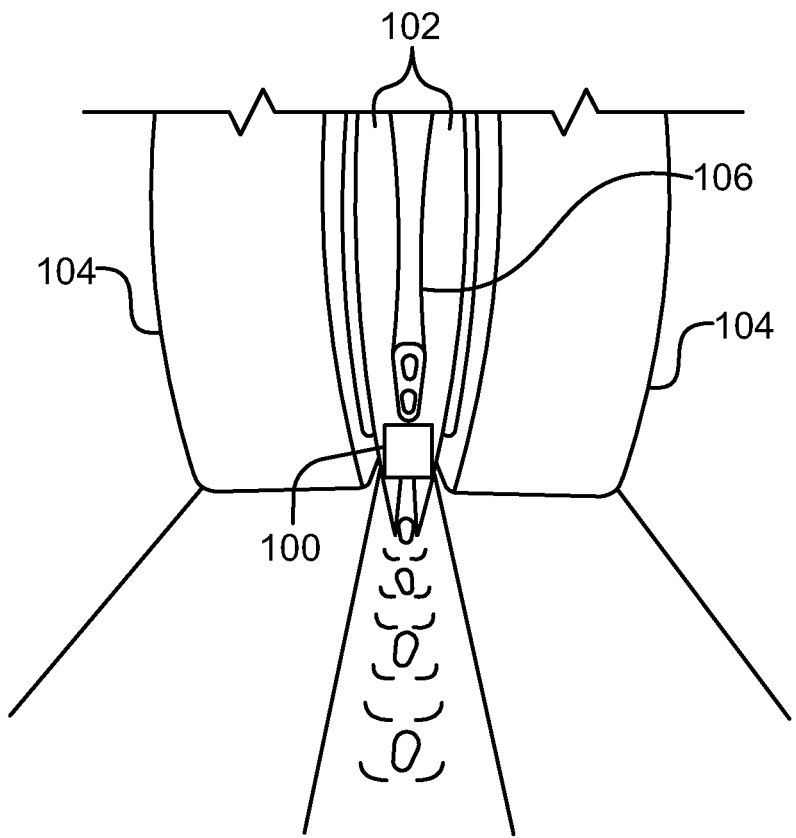
FIG. 6 is a rear view of an embodiment of an IR sensor placement location relative to a furrow opener.
Figure 7:
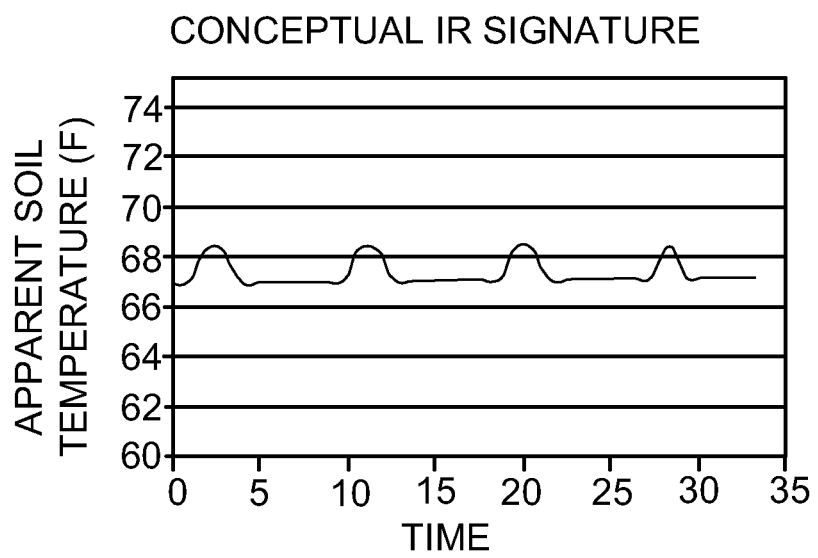
FIG. 7 is a graphical illustration of a seed presence signal using the IR sensor shown in FIGS. 4 and 5.

Referring now to FIG. 6, there is shown another exemplary placement location for an IR sensor 100 relative to a double disk furrow opener 102 and gauge wheels 104. In this embodiment, IR sensor 100 is located between the double disk furrow opener 102, and is attached to the bottom end of seed placement tube 106. IR sensor 100 communicates a seed presence signal to an electrical processor 16A and/or 16B. An example of a seed presence signal is shown in FIG. 7. The seed presence signal may be in the form of an analog signal with spikes occurring at seed presence locations within the furrow or seed trench 53. The seed presence locations may be time stamped as shown on the horizontal axis and converted to a seed spacing as described above, or alternatively may be geo-referenced to determine a seed spacing.

Figure 8:
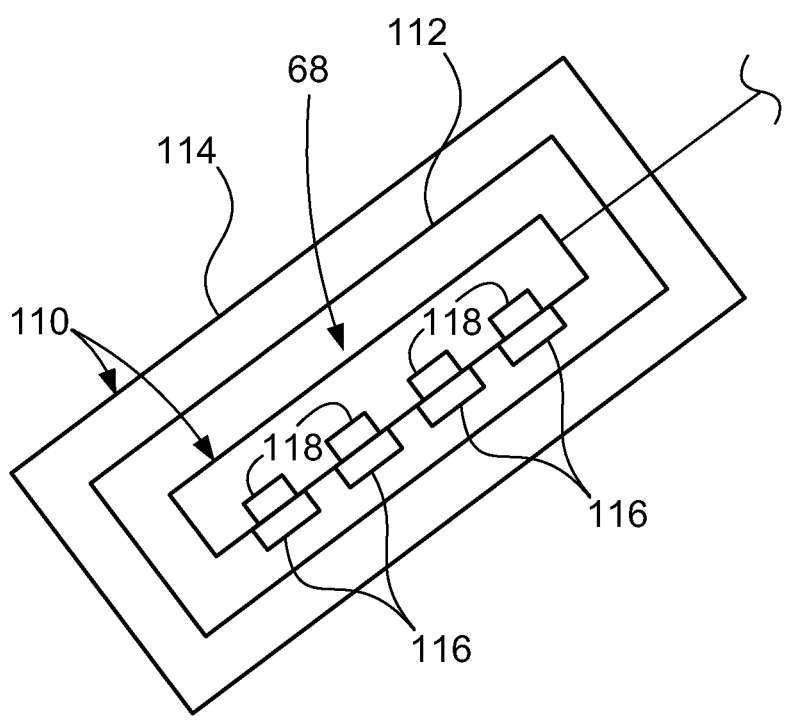
FIG. 8 is a schematic view of the IR sensor shown in FIGS. 4 and 5, with an optional sensor packaging assembly.

Referring now to FIG. 8, IR sensor 68 is shown within an optional sensor packaging assembly 110, including an inner packaging tube 112 and an outer packaging tube 114. Inner packaging tube 112 and outer packaging tube 114 are each constructed of a transparent or translucent material, such as a suitable plastic, that allows the individual sensors making up IR sensor 68 to sense the individual seeds within furrow 18. IR sensor 68 may include a number of lenses 116 respectively associated with each individual sensor 118 of IR sensor 68 for providing a reduced viewing angle and hence increased sensitivity. Alternatively, inner packaging tube 112 may include an integral lens for providing a reduced viewing angle and increased sensitivity. Inner packaging tube 112 may be placed inside of the larger diameter outer packaging tube 114, and a positive air flow may be introduced between the two tubes 112 and 114. This positive air-flow forms an air flow barrier to repel dirt away from the sensor lenses 116 or sensor surface.

Figure 9:
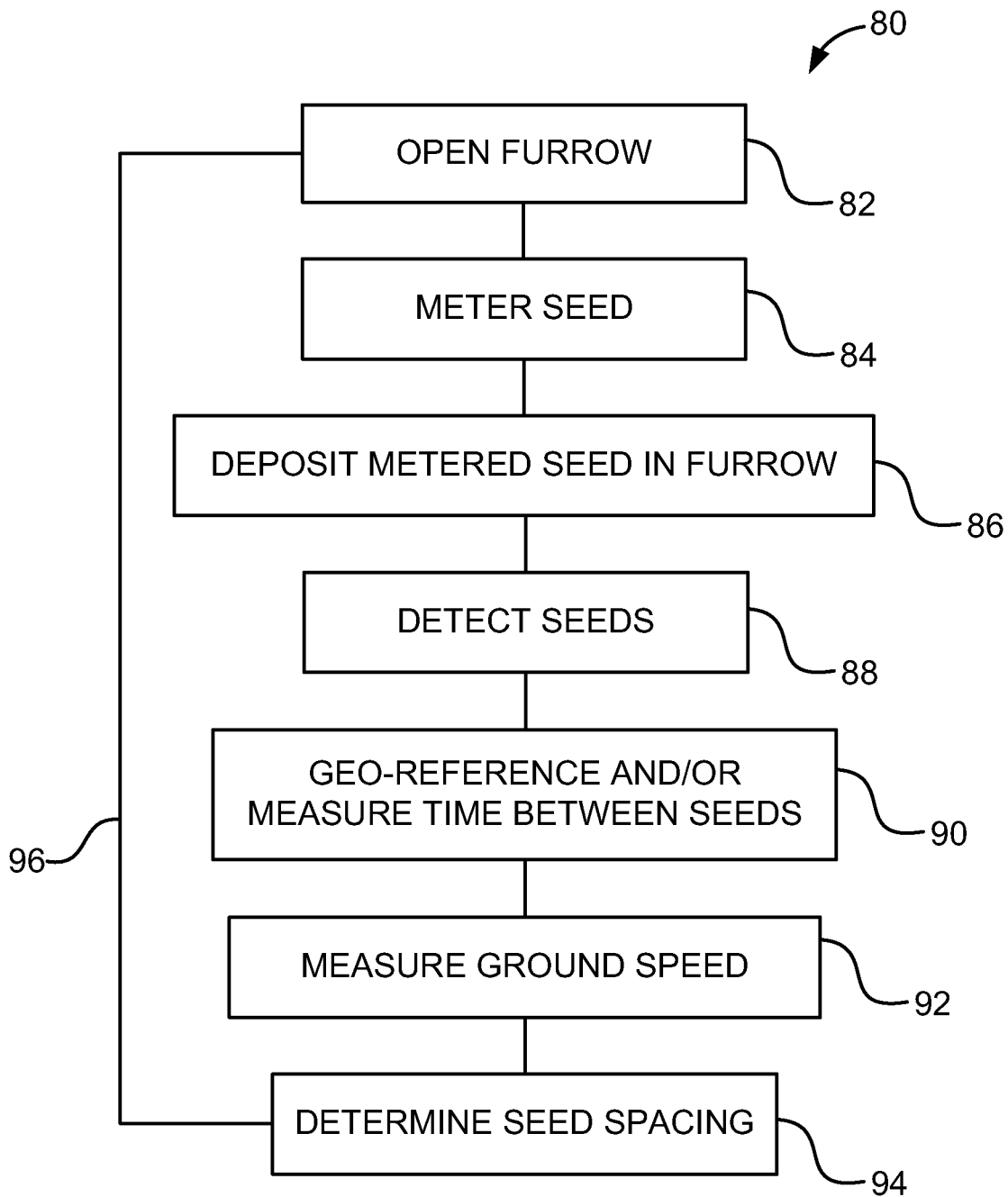
FIG. 9 is a flowchart of a method of operating a seeder using a seed spacing monitoring system of the present invention.

Referring now to FIG. 9, a method of operation 80 of the seed spacing monitoring system 16 will be described in greater detail. As described above, a furrow opener 28, 52, 102 is used to open a furrow in the soil (block 82). A seed metering system 36, 64 receives seed from a seed source, singulates the seed, and passes the singulated seed to a seed placement system (block 84). The singulated seed is deposited in the furrow by seed placement system 38, 60 at a predetermined seeding population (block 86). A temperature sensitive sensor 42, 68, 100 detects a series of seeds and transmits seed presence signals corresponding to each sensed seed to electrical processor 16A and/or 16B (block 88). Electrical processor 16A (or 16B) measures the time between the seeds and/or alternatively geo-references the seeds using a GPS 74 (block 90). The time between seeds is combined with a ground speed and used to determine a seed spacing between seeds (blocks 92 and 94). Alternatively, the geo-referenced seed locations may be used to directly determine the seed spacing between seeds. The monitoring method continues while the seeding operation is in effect, such as for a third seed, fourth seed, etc. (line 96).

More particularly, in the event that a time based approach is used, the ground speed is typically measured in units of miles per hour (miles/hour) and the time between seeds is measured in units of seconds/seed. Using appropriate conversion factors, the seed spacing (inches per seed) can be converted in one embodiment as follows:

$$\frac{miles}{hour} \times \frac{hour}{second} \times \frac{inches}{mile} \times \frac{second}{seed} = \frac{inches}{seed}$$

The ground speed and temperature sensitive sensor output signal can thus be combined in an appropriate manner to yield a measurement of seed spacing between seeds. The electrical processor 16B onboard tractor 12 may include a visual display which provides information to the operator in the form of the percentage of skips, the percentage of double seeding, the actual or average spacing of the seed, etc.

Memory within electrical processor 16A and/or 16B can store the seed spacing information for a predetermined number of seeds and calculate an average seed spacing together with a measure of variability, such as the standard deviation in the seed spacing, and display that information to the operator, such as at a display of electrical processor 16B. The operator can determine if the seed spacing is within the desired limits and also if the variability in seed spacing is within desired limits. If the average seed spacing and/or the variability are outside the desired limits, the operator can take corrective action.

Having described the preferred embodiment, it will become apparent that various modifications can be made without departing from the scope of the invention as defined in the accompanying claims.

The invention claimed is:

1. A row crop unit for use in an agricultural seeder for planting seeds in soil, said row crop unit comprising:
    a furrow opener for opening a furrow in the soil;
    a seed metering system for metering seed to be placed in the furrow;
    a seed placement system for placing seeds in the furrow, said seed placement system and said seed metering system being in communication with each other and at least in part defining a seed travel path associated with the furrow;
    a furrow closer to cover the seed in the furrow with soil;
    a seed temperature conditioner associated with said seed travel path for varying a temperature of seed traveling through said seed travel path; and
    a temperature sensitive sensor positioned to sense seed which has been deposited in the furrow between the furrow opener and the furrow closer.

2. The row crop unit of claim 1, wherein said seed temperature conditioner is a heater which elevates the temperature of the seed between 1 to 20° F.

3. The row crop unit of claim 2, wherein said heater elevates the temperature of the seed between approximately 1 to 5° F.

4. The row crop unit of claim 2, wherein said heater is one of:
    an exhaust from a fan associated with said seed metering system;
    an exhaust from an internal combustion engine;
    an electric heater;
    a gas powered heater; and
    a diesel powered heater.

5. The row crop unit of claim 2, wherein said heater is positioned in association with said seed metering system.

6. The row crop unit of claim 2, wherein said heater is positioned in association with said seed placement system.

7. The row crop unit of claim 1, wherein said temperature sensitive sensor comprises an infra-red sensor.

8. The row crop unit of claim 7, wherein said infra-red sensor is one of an infra-red camera and an infra-red scanner.

9. The row crop unit of claim 7, wherein said infra-red sensor is a linear array of infra-red sensors providing at least one seed presence signal.

10. The row crop unit of claim 9, wherein said linear array of infra-red sensors have one of:
    a combined output signal forming said at least one seed presence signal, and discrete signals from each said sensor making up said linear array of sensors.

11. The row crop unit of claim 9, wherein said linear array of infra-red sensors is positioned at a downward and rearward facing orientation relative to a travel direction of the row crop unit.

12. The row crop unit of claim 11, wherein said linear array of infra-red sensors is positioned at an angle of between approximately 15° to 60° relative to a horizontal.

13. The row crop unit of claim 12, wherein said linear array of infra-red sensors is canted with a side-to-side orientation of between approximately 5° to 45° relative to a vertical.

14. The row crop unit of claim 9, including at least one lens associated with said linear array of infra-red sensors for providing a reduced viewing angle and increased sensitivity.

15. The row crop unit of claim 9, including at least one packaging tube surrounding said linear array of infra-red sensors.

16. The row crop unit of claim 15, wherein said at least one packaging tube includes an inner packaging tube and a larger diameter outer packaging tube surrounding said inner packaging tube.

17. The row crop unit of claim 9, including an electrical processor which receives a plurality of said seed presence signals and establishes a plurality of times, each said time representing a time between detections of adjacent seeds in the furrow.

18. The row crop unit of claim 17, wherein said electrical processor determines a seed spacing based upon said plurality of times.

19. The row crop unit of claim 17, further including a geo-referencing system, and wherein said electrical processor geo-references each said seed presence signal using said geo-referencing system.

20. An agricultural seeder for planting seeds in soil, said seeder comprising:
  a tool bar; and
  at least one row crop unit coupled with said tool bar, each said row crop unit including:
    a furrow opener for opening a furrow in the soil;
    a seed metering system for metering seed to be placed in the furrow;
    a seed placement system for placing seeds in the furrow, said seed placement system and said seed metering system being in communication with each other and at least in part defining a seed travel path associated with the furrow;
    a furrow closer to cover the seed in the furrow with soil;
    a seed temperature conditioner associated with said seed travel path for varying a temperature of seed traveling through said seed travel path; and
    a temperature sensitive sensor positioned to sense seed which has been deposited in the furrow between the furrow opener and the furrow closer.

21. A seed spacing detection method for detecting seed spacing of seeds placed in a furrow by a seeder, said method comprising the steps of:
  opening a furrow in the soil;
  metering seed to be deposited in the furrow;
  varying a temperature of the seed prior to being deposited in the furrow;
  placing the metered seed in the furrow; and
  detecting seed in the furrow before the seed is covered with soil using a temperature sensitive sensor.

22. The seed spacing detection method of claim 21, wherein the step of varying the temperature of the seed comprises the step of heating the seed before depositing the seed into the furrow.

23. The seed spacing detection method of claim 22, wherein said heating step is carried out using a heater which is one of:
  an exhaust from a fan associated with said seed metering system;
  an exhaust from an internal combustion engine;
  an electric heater;
  a gas powered heater; and
  a diesel powered heater.

24. The seed spacing detection method of claim 21, wherein said detecting step is carried out using one of an infra-red camera and an infra-red scanner.

25. The seed spacing detection method of claim 21, wherein said detecting step is carried out using a linear array of infra-red sensors.

* * * * *